United States Patent [19]

Schenck et al.

[11] 4,297,255

[45] Oct. 27, 1981

[54] ADDUCT AND ITS USE

[75] Inventors: Hans-Uwe Schenck, Wachenheim; Erich Gulbins, Heidelberg-Neuenheim, both of Fed. Rep. of Germany

[73] Assignee: BASF Aktiengesellschaft, Fed. Rep. of Germany

[21] Appl. No.: 133,437

[22] Filed: Mar. 24, 1980

[30] Foreign Application Priority Data

Apr. 7, 1979 [DE] Fed. Rep. of Germany ....... 2914085

[51] Int. Cl.³ .................... C08L 63/00; C09D 3/58; C09D 5/40
[52] U.S. Cl. .................... 260/18 PF; 260/29.2 EP; 260/29.2 TN
[58] Field of Search ............... 204/181 C; 260/18 PF, 260/29.2 EP, 29.2 TN

[56] References Cited

U.S. PATENT DOCUMENTS

| | | | |
|---|---|---|---|
| 3,937,679 | 2/1976 | Bosso et al. | 204/181 C |
| 3,962,165 | 6/1976 | Bosso et al. | 204/181 C |
| 4,036,795 | 7/1977 | Tominaga | 204/181 C |
| 4,038,166 | 7/1977 | Bosso et al. | 204/181 C |
| 4,172,193 | 10/1979 | Marx et al. | 204/181 C |
| 4,207,222 | 6/1980 | Blum et al. | 204/181 C |

FOREIGN PATENT DOCUMENTS

| | | |
|---|---|---|
| 2033770 | 2/1971 | Fed. Rep. of Germany . |
| 2057799 | 7/1971 | Fed. Rep. of Germany . |
| 2163143 | 8/1972 | Fed. Rep. of Germany . |
| 2261804 | 6/1973 | Fed. Rep. of Germany . |
| 2252536 | 8/1973 | Fed. Rep. of Germany . |
| 2339398 | 2/1974 | Fed. Rep. of Germany . |
| 1303480 | 1/1973 | United Kingdom . |
| 1409728 | 10/1975 | United Kingdom . |
| 1411249 | 10/1975 | United Kingdom . |

*Primary Examiner*—Ronald W. Griffin
*Attorney, Agent, or Firm*—Keil & Witherspoon

[57] ABSTRACT

Adducts obtained by reacting an epoxide compound with guanidine or a guanidine derivative, using not less than 1 mole of guanidine or guanidine derivative per epoxide equivalent of the epoxide compound; the adducts may or may not be partially or completely neutralized by adding acid, and may additionally contain blocked isocyanate groups.

The novel adducts may be used, in combination with a completely blocked polyisocyanate, aminoplast resin and/or phenoplast resin, as binders in coating agents, and for the cathodic electrocoating of metal articles.

12 Claims, No Drawings

ADDUCT AND ITS USE

The present invention relates to an adduct and its use as a cationic binder, especially for cathodic electrocoating.

Aqueous dispersions or solutions—intended for surface coating—of resins containing cationic groups have been known for some time. Such products, which can be deposited on a metallic workpiece wired as the cathode, offer particular advantages when used in electrocoating.

In contrast to anodic electrocoating, cathodic electrocoating does not cause any problems of dissolution of the metal, the passivating layers remain undamaged, and the cationic coating as a rule improves the corrosion protection. Cathodic electrocoating agents have hitherto been based on water-dispersible or water-soluble resins possessing amine, ammonia, sulfonium or phosphonium groups. Examples of such binders are described in German Laid-Open Applications DOS 1,276,260, DOS 1,546,840, DOS 1,546,848, DOS 1,546,854, DOS 1,669,593, DOS 1,814,072, DOS 1,930,949, DOS 2,002,756, DOS 2,003,123, DOS 2,033,770, DOS 2,057,799, DOS 2,065,775, DOS 2,131,060, DOS 2,142,449, DOS 2,163,143, DOS 2,165,361, DOS 2,237,114, DOS 2,252,536, DOS 2,261,804, DOS 2,265,195, DOS 2,265,220, DOS 2,325,177, DOS 2,339,398, DOS 2,345,044, DOS 2,363,074, DOS 2,426,996, DOS 2,460,470, DOS 2,531,960, DOS 2,541,234, DOS 2,548,394, DOS 2,557,562, DOS 2,603,666, DOS 2,611,673, DOS 2,616,591, DOS 2,620,612, DOS 2,634,211, DOS 2,634,229, DOS 2,701,002, DOS 2,707,405, DOS 2,715,259, DOS 2,743,520, DOS 2,748,511, DOS 2,751,869, DOS 2,751,941, DOS 2,752,255, and DOS 2,752,256.

These binders have the disadvantage that, if they carry quaternary ammonium groups, they can indeed be dissolved or dispersed, as salts, in water at a neutral to alkaline pH, but that after deposition as the quaternary ammonium base, and after baking (especially at the desired low baking temperatures), the polar groups largely persist. Polymers containing phosphonium groups and polymers containing sulfonium groups have the disadvantage that these groups are unstable in a neutral or alkaline electrocoating bath of the type the user wishes to employ.

The use of neutralized primary, secondary or tertiary amino groups to solubilize the binders has the disadvantage that a very high content of amine groups is required to achieve solubilization at a neutral or alkaline pH, since, as a rule, only partial protonization is possible at such a pH. This means that after deposition and baking the resins retain a substantial content of basic nitrogen, which increases the water sensitivity of the films and the susceptibility to corrosion of the metal substrate under the films.

It is an object of the present invention to provide an adduct which may be used for the preparation of surface-coating binders which do not suffer from the above disadvantages.

We have found, surprisingly, that this object is achieved, and that binders which can readily be converted, at a neutral to alkaline pH, to stable aqueous solutions or dispersions, especially for electrocoating baths, may be obtained by introduction of guanidine groups. Guanidines are basic derivatives (amidines) of carbonic acid and of carbonic acid amide, ie. of urea. Because of the very high basicity of the guanidine group ($pK_a$ of unsubstituted guanidine=13.65 at 25° C.—Hall and Sprinkle, J. Am. Chem. Soc. 54 (1932), 3469), which tends to be even higher if the compound is alkyl-substituted, and which is more than 4 $pK_a$ units greater than the $pK_a$ of ammonia and more than 2 $pK_a$ units greater than that of the strongest aliphatic amines, it is possible to prepare aqueous solutions or dispersions having a neutral to alkaline pH even if only small amounts of basic groups are present in the resin and even if the product is fully neutralized. A further advantage of the guanidine group is that on baking it can, by virtue of its high NH functionality, react—given a suitable crosslinking method, for example with free isocyanato groups formed from blocked isocyanate groups—to give non-ionic and hence substantially non-polar groups, or that it can decompose, under the action of water and heat, into $CO_2$, ammonia and the corresponding primary or secondary amine, depending on the degree of substitution of the guanidine group. These amines are far less basic than the initial guanidine group. Furthermore, such amine groups cannot be converted to non-ionic, substantially non-polar, groups by suitable crosslinking methods (for example by reaction with isocyanate groups).

The invention relates to an adduct which has been obtained by reacting
 (a) an epoxide compound with
 (b) guanidine or a guanidine derivative
using not less than 1 mole of guanidine or guanidine derivative (b) per epoxide equivalent of the epoxide compound (a). The adduct may or may not be partially or completely neutralized by adding an acid. Furthermore, the novel adduct can contain blocked isocyanate groups.

The present invention further relates to the use of the adduct according to the invention, with or without combination with a completely blocked polyisocyanate, an aminoplast resin and/or a phenoplast resin, as a binder in coating agents, and more specifically its use in aqueous coating agents for the cathodic electrocoating of metal articles, which coating agents may or may not additionally contain from 5 to 40, preferably from 15 to 30, % by weight, based on total binder, of a blocked polyisocyanate, an aminoplast resin and/or a phenoplast resin.

In preparing the adduct according to the invention, an epoxide compound containing one or more epoxide groups, preferably a glycidyl ether of a polyhydric alcohol or phenol, is used as the starting material. Examples of suitable polyhydric alcohols are aliphatic alkanediols of 2 to 8 carbon atoms, alkanetriols, eg. glycerol, alkanetetrols, e.g. pentaerythritol and cycloaliphatic diols, e.g. bis-(4-hydroxycyclohexyl)-2,2-propane. Polyhydric polynuclear phenols, especially bisphenol A, are however particularly preferred. Other suitable alcohols are listed in German Laid-Open Application DOS 2,261,804. These polyhydric alcohols or phenols are etherified with epichlorohydrin to give the corresponding glycidyl ether. However, epoxidized oils, eg. epoxidized linseed oil or polybutadiene oil, may also be used.

The epoxide compound is reacted with guanidine, with a guanidine derivative, for example an alkylguanidine, eg. dimethylguanidine, or with a guanidinium salt derived from these. Examples of suitable guanidinium salts are guanidine carbonate, guanidine acetate, guanidine nitrate and the like.

To prepare the epoxide-free adducts which are preferred according to the invention, at least one mole of guanidine or of one of its salts is employed per epoxide group. The ratio of epoxide groups to guanidine must be carefully chosen to prevent premature crosslinking. If substantially less than one mole of guanidine is used per equivalent of epoxide group capable of reaction, an undesirably large proportion of epoxide groups remains in the binder and may lead to side-reactions. The preparation of the adduct may be carried out in the absence of solvents or in a suitable solvent, eg. dioxane, dimethylformamide or ethylene glycol, at from 10° to 150° C., preferably from 20° to 80° C.

To avoid crosslinking reactions, it is also possible first to use a substantial molar excess of guanidine, which, after the epoxide groups have been consumed, is removed again from the reaction mixture by distillation, preferably under reduced pressure.

It is also possible first to synthesize, in a preliminary reaction, a resinous material, for example based on reaction products of aliphatic or aromatic polyepoxy resins with polyols (for example with hydroxyl-containing polyurethanes, hydroxyl-containing polyethers and the like) or with polyphenols (for example reaction products of polyepoxides with an excess of bisphenol A), which resinous material has such a high residual epoxide functionality per individual molecule that reaction with guanidine (about 1 mole of guanidine per mole of residual expoxide content) does not cause crosslinking, but neutralization at a slightly acid pH or, preferably, at a pH above 7, renders the resin water-dispersible or water-soluble.

Regardless of the chosen method of introducing guanidine groups into the binder, the amount of guanidine groups, relative to the remainder of the resinous substance, required to achieve the desired degree of solubilization (good compatibility of the resin with water above pH 7, ie. completely or partially neutralized guanidine groups, but precipitation at a strongly alkaline pH, so as to ensure cataphoretic disposition) may vary. The amount depends on the one hand on the molecular weight and on the other hand on the total structure of the end product, for example on the balance between hydrophilic or polar groups (hydroxyl, ether, amide or urethane groups) and hydrophobic units in the resin, leaving the guanidine modification out of account.

The degree of modification with guanidine groups, the molecular weight and the structure of the resin starting material should be selected so as to give a stable dispersion or solution when a partially or completely neutralized product is mixed with an aqueous medium. The resin should be capable of cataphoretic deposition from the resulting dispersion or solution, to give a film which adheres firmly to the cathode and is no longer easily removable by rinsing with water.

The parameters mentioned, namely structure, molecular weight and degree of modification with guanidine, are inter-related as far as the achievement of the desired final properties is concerned. For example, a lesser degree of modification with guanidine groups is needed if the resin has a higher content of other polar groups, eg. hydroxyl or ether groups. The selection of the optimum relations—for obtaining the desired properties—between molecular weight, structure of the starting resin and degree of modification with guanidine presents no difficulties to an expert.

In the molecular weight range of from about 500 to 50,000 which is of interest for aqueous surface-coating binders and more specifically for electrocoating binders, from about 0.01 to 10 milliequivalents of guanidine groups as a rule suffice per gram of resin solids.

The adduct obtained, containing substituted guanidine groups, is advantageously at least partially neutralized with acid before use in an aqueous medium. This neutralization should provide from 0.1 to 1.5, preferably from 0.5 to 1.0, protons per guanidine group. The amount of acid depends on the number of guanidine groups introduced into the resin and on the pH required to solubilize or disperse the product in water.

In a particular embodiment, guanidine is hydroxyalkylated with epoxide compounds which contain hydroxyl groups which have been reacted with partially blocked polyisocyanates. Examples of the latter are partially blocked toluylene diisocyanate, isophorone diisocyanate, hexamethylene diisocyanate and more highly condensed polyisocyanates, eg. reaction products of 1 mole of ethylene glycol with 2 moles of isophorone diisocyanate or of 1 mole of trimethylolpropane with 3 moles of toluylene diisocyanate. Examples of suitable blocking agents are lactams, eg. $\epsilon$-caprolactam, phenols, cresols, oximes, piperidone, piperidine, acetoacetic acid esters, malonic acid esters, alcohols and imidazoles. The polyisocyanates are only partially blocked, so that one isocyanate group remains free and is able to react with the hydroxyl groups of the epoxide compounds. In this way, self-crosslinking binders can be synthesized.

The novel protonized adducts are diluted with water, preferably to a solids content of from 5 to 20% if they are to be used for electrocoating. The additives conventionally used in surface coatings, eg. other binders, crosslinking agents, pigments, fillers, flow improvers, coupling solvents, catalysts and plasticizers, may be admixed. If the binders have not been rendered self-crosslinking through modification with semi-blocked polyisocyanates, it is advantageous to mix them with crosslinking agents, preferably with from 5 to 40, especially from 15 to 30, % of these, based on solids. Suitable crosslinking agents are those possessing functional groups which on baking react with the guanidine and/or amino and/or hydroxyl groups of the binders containing guanidine groups, for example completely blocked polyisocyanates, melamine/formaldehyde resins, phenol/formaldehyde resins, acrylate resins which contain carboxyl groups or N-methylol-ether groups, epoxy resins, polyester resins and alkyd resins.

The binders obtained using the adducts according to the invention may be employed for coating metals and, if applied by conventional methods, also for coating wood or plastic. They may be applied by conventional methods such as spraying, dipping or casting, but electrocoating is preferred. In the latter method, a d.c. voltage, which may be from a few volt to several 100 volt and is as a rule from 50 to 500 volt is applied, in an aqueous bath, between an immersed anode and the article to be coated, which is wired as the cathode. Coating is allowed to take place until a layer from 10 to 30 $\mu$m thick has been deposited. The article is then taken out of the bath, rinsed with water and baked for from 10 to 30 minutes at from 120° to 250° C. The electrocoating baths may range from slightly acid to slightly alkaline, a pH of from 6 to 10, especially from 7 to 9, being preferred. Working at a neutral pH has the advantage that the coating equipment does not corrode.

The coatings obtained possess good resilience and excellent resistance to solvents, detergents and caustic alkalis. The binders are therefore particularly suitable for coating automotive components and household utensils, as is illustrated by Examples below.

In the Examples, parts and percentages are by weight, unless stated otherwise.

EXAMPLE 1

An epoxide-containing resin suitable for reaction with guanidine is prepared as follows:

34.2 Parts of bisphenol A and 9.41 parts of phenol are mixed and heated to 160° C. under nitrogen. 50 parts of a liquid polyglycidyl ether based on pentaerythritol (epoxide equivalent weight 165) are then added dropwise over 15 minutes, whilst stirring. Thereafter the mixture is cooled to 100° C. and 1.22 parts of tetrabutylammonium iodide are added. A further 150 parts of the above liquid polyglycidyl ether based on pentaerythritol are run in over a further 50 minutes, at 100° C. The reaction is continued until a viscosity, measured on a plate-and-cone viscometer, of 0.52 Pa.s at 100° C. is reached. 30 parts of mercaptoethanol are then added over 15 minutes at 100° C. and the mixture is stirred at the same temperature until a residual epoxide value of 0.162 is reached. At that stage the viscosity, measured as above, at 100° C. is 2.1 Pa.s. The product is finally diluted with 183.2 parts of methyldiglycol to a solids content of about 60% by weight.

The modification with guanidine is carried out by first adding 100 parts of the above solution of modified epoxy resin, based on a pentaerythritol polyglycidyl ether, dropwise over 50 minutes, at 70° C., to 23.3 parts of a 50% strength by weight solution of guanidine in methanol. The reaction is then allowed to continue for 30 minutes. Thereafter, 182.4 parts of a 60% strength solution of a reaction product of a polyglycidyl ether of bisphenol A (epoxide equivalent weight 500) with mercaptoethanol (0.5 mole of mercaptoethanol per epoxide group, epoxide value of the solution 0.077) in ethylglycol are added dropwise over 1 hour 15 minutes at 70° C. The batch is then stirred at 70° C. until a constant final viscosity is reached (plate-and-cone viscosity at 100° C.: 0.3 Pa.s). The solids content is 59.2%.

EXAMPLE 2

To obtain a crosslinkable system, 118.2 parts of the solution of the guanidine-modified epoxy resin, obtained as described in Example 1, are mixed with 37.5 parts of an 80% strength solution, in toluene, of a commercial biuret-modified hexamethylene diisocyanate blocked with methyl ethyl ketoxime.

To test the product as a water-based finish to be applied by conventional methods, 3 parts of glacial acetic acid are stirred into 155.7 parts of the above mixture of guanidine-modified epoxy resin and fully blocked polyisocyanate and the batch is diluted to a solids content of 30% by weight with 177.6 parts of water. The dispersion is sprayed onto zinc-phosphatized steel sheet and after air-drying for 5 minutes at room temperature, is baked for 30 minutes at 180° C. An acetone-resistant smooth, glossy coating, which withstands flexing, is obtained.

Coating thickness: 19 μm
Pencil hardness: 2H
Reverse impact: 110 i/b
Salt spray test (DIN 50,021): no attack For testing as a cathodic electrocoating binder, 3.0 parts of glacial acetic acid are stirred into 155.7 parts of the mixture of the solutions of guanidine-modified epoxy resin and blocked polyisocyanate. On dilution with 844.3 parts of water, a stable, milky dispersion having a solids content of 10% and a pH of 8.2 is obtained.

A film is deposited from this binder dispersion at 100 V, over 2 minutes, onto a zinc-phosphatized steel sheet wired as the cathode; after baking for 30 minutes at 180° C., a 28 μm thick smooth acetone-resistant film results.

Coating thickness: 25 μm
Pencil hardness: 2H
Reverse impact: 100 i/b
Salt spray test (DIN 50,021): 1 mm rust penetration.

If, in this Example, 29.5 parts of a highly etherified melamine resin are employed in place of 37.5 parts of blocked polyisocyanate, in order to obtain a crosslinkable binder system, an advantageous electrocoating binder is again obtained.

EXAMPLE 3

To obtain a crosslinkable system, 80 parts of the solution of the guanidine-modified epoxy resin, obtained as described in Example 1, are mixed with 20 parts of a commercial melamine resin which has been highly etherified with methanol/ethanol.

After adding a few drops of tricresyl phosphate, the binder solution is sprayed onto zinc-phosphatized steel sheet and the coating is baked for 30 minutes at 180° C. An acetone-resistant, smooth, glossy coating which withstands flexing is obtained.

Coating thickness: 18 μm
Pencil hardness: 6H
Reverse impact: 160 i/b
Salt spray test (DIN 50,021): no attack

EXAMPLE 4

A partially blocked 2,4-toluylene diisocyanate is first prepared by adding 130.2 parts of 2-ethylhexanol to a mixture of 174 parts of 2,4-toluylene diisocyanate and 20 parts of methyl butyl ketone over about 4 hours whilst stirring the mixture under nitrogen and excluding moisture. The reaction temperature is kept below 30° C. After the addition, stirring is continued for 1 hour at 25° C.

A guanidine-modified self-crosslinking epoxy resin is prepared by adding the total amount of the partially blocked 2,4-toluylene diisocyanate solution, obtained as described above, and 0.1 ml of dibutyl-tin dilaurate to 833 parts of an anhydrous 60% strength solution of a polyglycidyl ether of bisphenol A (epoxide equivalent weight 500) in methyl butyl ketone at 90° C. The reaction is then allowed to proceed for 40 minutes at 120° C.

The resulting solution is then added dropwise over 30 minutes to 497.5 parts of a 12.6% strength solution of guanidine in n-butanol under nitrogen at 70° C., with external cooling. Thereafter the reaction is allowed to proceed for a further 2 hours.

A clear solution is obtained.

After having been neutralized with 60 parts of glacial acetic acid, the binder is introduced into 435 parts of water, with thorough stirring, and the n-butanol is distilled off azeotropically at 30° C. and 30 mbar. The water entrained in the azeotrope is recycled. A milky dispersion having a solids content of 50.6% and a pH of 8.1 is obtained.

To test the product as a water-based finish for conventional application, it is diluted to a solids content of 30% with water. The dispersion is then knife-coated onto a zinc-phosphatized steel sheet, air-dried for 5 minutes at room temperature and then baked for 30 minutes at 180° C. An acetone-resistant, smooth, glossy coating is obtained.

Coating thickness: 23 μm
Pencil hardness: 3H
Reverse impact: 120 i/b
Salt spray test (DIN 50,021): no attack

EXAMPLE 5

A binder mixture containing epoxide groups and capable of reaction with guanidine is prepared as follows:

A mixture of 400 parts of a liquid pentaerythritol polyglycidyl ether (epoxide equivalent weight 165), 400 parts of a polyglycidyl ether of bisphenol A (epoxide equivalent weight 500), 91.2 parts of bisphenol A and 37.6 parts of phenol is homogenized under nitrogen at 100° C. 74.4 Parts of mercaptoethanol are then added dropwise over 30 minutes at 100° C. and the reaction is allowed to proceed for a further 30 minutes. 5.0 Parts of tetrabutylammonium iodide are added and the batch is stirred at 100° C. until a plate-and-cone viscosity of 0.5 Pa.s at 150° C. is reached; this requires about 2 hours. The mixture is then diluted to a solids content of 60% by weight by adding 669 parts of ethylglycol, and is cooled. Plate-and-cone viscosity of the solution at 75° C.: 0.02 Pa.s. Epoxide value 0.069.

200 Parts of the solution thus obtained are reacted with 5.23 parts of mercaptoethanol for 2 hours at 80° C. to obtain an epoxide value of 0.034. The total solution obtained, having a solids content of 61% by weight, is then added dropwise over 1 hour 20 minutes, with stirring, to 7.96 parts of a 50% strength guanidine solution in methanol at 70° C., and the mixture is stirred until the viscosity remains constant. A solution having a solids content of 60.6% by weight and a plate-and-cone viscosity of 0.42 Pa.s. at 75° C. is obtained.

To obtain a crosslinkable system, 115.5 parts of the solution of the guanidine-modified epoxy resin are mixed with 37.5 parts of an 80% strength solution of a commercial biuret-modified hexamethylene diisocyanate, blocked with methyl ethyl ketoxime, in toluene.

To test the product as a cathodic electrocoating binder, 1.8 parts of glacial acetic acid are stirred into 153 parts of the above mixture.

Dilution with 847 parts of water gives a stable milky dispersion having a solids content of 10% and a pH of 7.4.

A film is deposited from this binder dispersion at 120 V, over 2 minutes, onto a zinc-phosphatized steel sheet wired as the cathode; after baking for 30 minutes at 180° C., a 22 μm thick, smooth, acetone-resistant film which withstands flexing is obtained.

Pencil hardness: 6H
Reverse impact: 160 i/b
Salt spray test (DIN 50,021): 1–2 mm rust penetration

EXAMPLE 6

To obtain a crosslinkable system, 80 parts of the solution of the guanidine-modified epoxy resin, obtained as described in Example 5, are mixed with 20 parts of a commercial melamine resin highly etherified with methanol/ethanol.

After adding a few drops of tricresyl phosphate, the binder solution is sprayed onto zinc-phosphatized steel sheet and baked for 30 minutes at 180° C. An acetone-resistant, smooth, glossy coating which withstands flexing is obtained.

Coating thickness: 20 μm
Pencil hardness: 5H
Reverse impact: 140 i/b
Pendulum hardness: 199

We claim:
1. An adduct which has been obtained by reacting
    (a) an epoxide compound selected from the group consisting of glycidyl ether of a polyhydric alcohol or phenol, epoxidized oils and reaction products of aliphatic or aromatic polyepoxy resins with polyols or polyphenols with
    (b) guanidine or a guanidine derivative using not less than 1 mole of guanidine or alkylguanidine or a guanidinium salt (b) per epoxide equivalent of the epoxide compound (a), and which may or may not have been partially or completely neutralized by adding an acid.
2. The adduct of claim 1, which additionally contains blocked isocyanate groups.
3. The adduct of claim 1, wherein the epoxide compound used is a glycidyl ether of a polyhydric alcohol or phenol, or an epoxidized oil.
4. The adduct of claim 2, wherein the epoxide compound used is a glycidyl ether of a polyhydric alcohol or phenol, or an epoxidized oil.
5. The adduct of claim 1, wherein an alkylguanidine or a guanidinium salt is used as the guanidine derivative.
6. The adduct of claim 2, wherein an alkylguanidine or a guanidinium salt is used as the guanidine derivative.
7. The adduct of claim 1, which contains from 0.01 to 10 milliequivalents of guanidine groups per gram of resin solids.
8. The adduct of claim 2, which contains from 0.01 to 10 milliequivalents of guanidine groups per gram of resin solids.
9. An aqueous coating dispersion or solution which comprises: water, the adduct of claim 1 and a completely blocked polyisocyanate, aminoplast resin and/or phenoplast resin.
10. An aqueous coating dispersion or solution which comprises: water, the adduct of claim 2 and a completely blocked polyisocyanate, aminoplast resin and/or phenoplast resin.
11. A method of cathodic electrocoating of metal articles which comprises: immersing an anode and the metal article to be coated in an electrocoating bath comprising the dispersion or solution of claim 9, the pH of said bath being from 6 to 10, applying a DC voltage between the immersed anode and the article to be coated, which article is wired as the cathode, and coating the metal until a layer of from 10 to 30 μm thickness has been formed.
12. A method of cathodic electrocoating of metal articles which comprises: immersing an anode and the metal article to be coated in an electrocoating bath comprising the dispersion or solution of claim 10, the pH of said bath being from 6 to 10, applying a DC voltage between the immersed anode and the article to be coated, which article is wired as the cathode, and coating the metal until a layer of from 10 to 30 μm thickness has been formed.

* * * * *